United States Patent
Maltz et al.

(10) Patent No.: US 8,780,409 B2
(45) Date of Patent: Jul. 15, 2014

(54) METHOD AND SYSTEM FOR OPTIMIZING BLACK POINT COMPENSATION PARAMETERS

(71) Applicants: Martin Maltz, Rochester, NY (US); Alvaro E. Gil, Rochester, NY (US); Himanshu J. Madhu, Webster, NY (US); Lina Fu, Fairport, NY (US); J. Michael Sanchez, Rochester, NY (US)

(72) Inventors: Martin Maltz, Rochester, NY (US); Alvaro E. Gil, Rochester, NY (US); Himanshu J. Madhu, Webster, NY (US); Lina Fu, Fairport, NY (US); J. Michael Sanchez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 88 days.

(21) Appl. No.: 13/668,066

(22) Filed: Nov. 2, 2012

(65) Prior Publication Data
US 2014/0126003 A1  May 8, 2014

(51) Int. Cl.
*H04N 1/60* (2006.01)
*H04N 1/46* (2006.01)
*G03F 3/08* (2006.01)

(52) U.S. Cl.
USPC ............ 358/1.9; 358/504; 358/518; 358/529; 358/3.06

(58) Field of Classification Search
USPC .......................... 358/1.9, 504, 518, 529, 3.06
See application file for complete search history.

(56) References Cited

U.S. PATENT DOCUMENTS

| | | | | |
|---|---|---|---|---|
| 7,554,705 | B2 * | 6/2009 | Edge | 358/529 |
| 8,154,765 | B2 * | 4/2012 | Purdum et al. | 358/1.9 |
| 8,441,680 | B2 * | 5/2013 | Wang et al. | 358/1.9 |
| 2010/0259794 | A1 | 10/2010 | Purdum et al. | |
| 2011/0019212 | A1 | 1/2011 | Wang et al. | |

* cited by examiner

*Primary Examiner* — Charlotte M Baker
(74) *Attorney, Agent, or Firm* — Pillsbury Winthrop Shaw Pittman, LLP

(57) ABSTRACT

A method for processing black point compensation parameters for a color image to be printed so as to enhance image quality of the color image is provided. The method includes analyzing image content of a received color image to identify one or more performance attributes to be considered during a black point compensation parameters processing procedure, the performance attributes estimate an effect of the black point compensation parameters on the image quality of the received color image; selecting, based on the identified performance attributes, a black point compensation (BPC) algorithm to be used during the processing procedure; deriving a model using the identified performance attribute that is configured to estimate relationships between the black point compensation parameters and the identified performance attribute; maximizing the performance attribute of the derived model so as to process the BPC parameters for the color image; and using the processed black point compensation parameters to construct output device profiles.

20 Claims, 12 Drawing Sheets

METHOD AND SYSTEM FOR OPTIMIZING BLACK POINT COMPENSATION PARAMETERS

REFERENCE TO AN APPENDIX

This application includes an Appendix A, which is a hard copy print out of "Multivariate Adaptive Regression Splines," by Friedman, J. H. published in 1991 in Annals of Statistics 19 (1), pages 1-78 and its related discussion, consisting of 158 pages; an Appendix B, which is a hard copy print out of "Descriptive Sampling: An Improvement Over Latin Hypercube Sampling," by Eduardo Saliby published in Proceedings of the $29^{th}$ Conference on Winter Simulation, pages 230-233, IEEE Computer Society Washington, D.C., 1997 consisting of 4 pages; and an Appendix C, which is a hard copy print out of "Survey of Multi-Objective Optimization Methods For Engineering," by R. T. Marler and J. S. Arora published in 2004 in Structural and Multidisc Optimization 36, pages 369-395, consisting of 27 pages. The material in these Appendices is incorporated by reference herein.

BACKGROUND

1. Field

The present disclosure relates to a system and a method for optimizing black point compensation parameters.

2. Description of Related Art

Generally, the black point compensation (BPC) function or algorithm is used for Red, Green and Blue (RGB) images to retain shadow details in images because many images contain colors that are darker than the darkest color a printer can make. Without black point compensation, details in these shadow regions may be lost. These details may contain information the viewer knows should be there (such as, for example, the folds of a dark coat, the strands of dark hair, etc.). Their absence when printed may be displeasing for a particular user.

The black point compensation may generally include an input L* (input image data) to an output L* (image data to be rendered by the printer) mapping function that is used in a color management look-up table (LUT). This input L* to output L* mapping function is a parameterized quadratic or parabolic function which is used to modify the L* values of all the node colors in the multi-dimensional look-up table. The black point compensation is used as a single-valued scalar function.

The black point compensation function that retains the details in dark colors (e.g., hairs) includes two parameters: offset and slope, m. These two parameters are used to control the effects (i.e., retain darkness vs. details) in the color images.

For example, the BPC algorithm is generally implemented using the following Equation (1) for the dark region:

$$L^*_0 = L^*_p + \text{offset} + m^*L^*_i + n^*L^{*2}_i \quad (1)$$

where $L^*_0$ is the L* output by the BPC algorithm (i.e., image data to be rendered by the printer);

$L^*_p$ is the minimum L* value that the printer can produce;

$L^*_i$ are the L* values obtained from an image or a group of images to be rendered;

offset is the first tunable parameter of the BPC algorithm and can be used to adjust for the known statistics of the input image (for example, if $L^*_i$ never goes to zero, it would waste dynamic range to map $L^*_i=0$ to $L^*_p$);

m is the second tunable BPC parameter of the BPC algorithm or slope; and n is equal to the expression $$\frac{(1-m)^2}{4 * L^*_i}$$

which makes the $L^*_0$ curve become tangent to the identity curve ($L^*_0 = L^*_i$) at the critical value $L^*_c = (1-m)/(2^* n)$.

For the light region ($L^*_i$ greater than $L^*_c$), the identity curve is used.

The second tunable parameter of the BPC algorithm, m is the slope of the BPC parabolic function. This parameter controls the shape of the parabola joining the identity part of the BPC curve (i.e., when $L^*_i = L^*_0$).

FIGS. 1A-1D provide relationships between $L^*_i$ and $L_0$ for different slope and offset parameter values. Specifically, FIGS. 1A-1D show the effects of the offset parameter value and slope parameter value, m on the $L^*_0$ (i.e., L* output by the BPC algorithm). Each of the graphs shown in FIGS. 1A-1D illustrates $L^*_i$ (i.e., the L* value that is input to the BPC algorithm) value on a horizontal x-axis. On a vertical y-axis, each of these graphs illustrates $L^*_0$ value. These curves were drawn for a printer with a $L^*_p$ value of about 12.

The graph in FIG. 1A illustrates the relationship between $L^*_i$ and $L^*_0$ for the offset parameter value of 0.43 and the slope parameter value of 0.13. The BPC curve in the graph in FIG. 1A has a quadratic behavior for the darker colors.

The graph in FIG. 1B illustrates the relationship between $L^*_i$ and $L^*_0$ for the offset parameter value of 0.43 and the slope parameter value of 0.77. The BPC curve in the graph in FIG. 1B has a more linear behavior. By comparing the graphs of FIGS. 1A and 1B, it can be realized that, as the slope parameter value is increased while keeping the offset parameter value constant, the quadratic behavior of the BPC curve changes into a linear behavior. Also, by increasing the slope parameter values, finer details may be obtained.

The graph in FIG. 1C illustrates the relationship between $L^*_i$ and $L^*_0$ for the offset parameter value of 2.6 and the slope parameter value of 0.13. The BPC curve in the graph in FIG. 1C has a quadratic behavior for the darker colors. By comparing the graphs of FIGS. 1A and 1C, it can be realized that the quadratic behavior of the BPC curves remains unchanged. However, an increase in the offset parameter value while the slope parameter value is maintained constant results in an increase in the darker $L^*_0$ values. For example, the minimum $L^*_0$ value for the graph in FIG. 1A is approximately 12, while the minimum $L^*_0$ value for the graph in FIG. 1C is approximately 14.6.

The graph in FIG. 1D illustrates the relationship between $L^*_i$ and $L^*_0$ for the offset parameter value of 2.6 and the slope parameter value of 0.77. The BPC curve in the graph in FIG. 1D has a more linear behavior. By comparing the graphs of FIGS. 1A and 1D, it can be noticed that the quadratic behavior of the BPC curves becomes linear as the slope parameter value is increased. Also, the increase in the offset parameter value results in an increase in $L^*_0$ values. For example, the minimum L* value for the graph in FIG. 1A is approximately 12, while the minimum L* value for the graph in FIG. 1D is approximately 16.24.

Previous disclosures where BPC has been used have focused on parametric BPC algorithms for increasing shadow details and/or gloss reduction using look-up tables, for image dependent applications, for piece-wise multi-axis algorithms and for printing operations using multiple printing apparatus to output what is to be considered a single print job. None of these above-discussed approaches offers a process to optimize the BPC parameters so that the BPC parameters have to be manually tuned.

BPC algorithms are generally used to closely reproduce shadow details contained on images. Another approach introduces an online automation of the BPC parameters that seek to maximize shadow details, highlight details, and saturation of colors contained in images. That is, this approach offers an automatic workflow, which aims at minimizing the resources used during the optimization of BPC parameters. It focuses on balancing shadows, highlight details, and color attributes by optimizing two BPC parameters. This optimization process is applied online to either a particular image or a set of images whenever the customer demands to execute the optimization process.

One disadvantage of this approach is that International Color Consortium (ICC) profiles built with those parameters remain fixed. If new images are processed and the optimization is not invoked, this setting might not be optimal for the new images.

Another drawback is that this approach always assumes the need for optimizing all the individual cost functions (i.e., shadows details, highlight details, and color attributes or color saturation), which might not be the case for certain images. This results in an overhead in the optimization process that is not necessary. The process in this approach can be manually modified to select the individual costs, but there is a need for an approach in which selection of the individual cost functions is done automatically by analyzing the content of the images to be ripped.

Also, yet another drawback of this approach is the lack of an input parameter in the BPC algorithm that provides the option of increasing the saturation of colors without avoiding highlights clipping. Therefore, there is a need for a framework where this limitation is not present as well as a way to perform the optimization during image ripping.

SUMMARY

In one embodiment, a method for processing black point compensation (BPC) parameters for a color image to be printed so as to enhance image quality of the color image is provided. The method is implemented in a computer system comprising one or more processors configured to execute one or more computer program modules. The method includes analyzing image content of a received color image to identify one or more performance attributes to be considered during a black point compensation parameters processing procedure, wherein the performance attributes estimate an effect of the black point compensation parameters on the image quality of the received color image; selecting, based on the identified performance attributes, a black point compensation (BPC) algorithm to be used during the processing procedure; deriving a model using the identified performance attributes, the model being configured to estimate relationships between the black point compensation parameters of the selected black point compensation (BPC) algorithm and the identified performance attributes; maximizing the performance attributes of the derived model so as to process the black point compensation parameters for the color image; and using the processed black point compensation parameters to construct output device profiles.

In another embodiment, a system for processing black point compensation parameters for a color image to be printed by an image printing system so as to enhance image quality of the color image is provided The system includes a processor configured to: analyze image content of a received color image to identify one or more performance attributes to be considered during a black point compensation parameters processing procedure, wherein the performance attributes estimate an effect of the black point compensation parameters on the image quality of the received color image; select, based on the identified performance attributes, a black point compensation (BPC) algorithm to be used during the processing procedure; derive a model using the identified performance attributes, the model being configured to estimate relationships between the black point compensation parameters of the selected black point compensation (BPC) algorithm and the identified performance attributes; maximize the performance attributes of the derived model so as to process the black point compensation parameters for the color image; and use the processed black point compensation parameters to construct output device profiles.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

The present disclosure proposes a method and a system for optimizing the BPC parameters of a color image. Specifically, the method and the system of the present disclosure proposes to implement the following steps or procedures during the optimization process: (i) analyze the content of images in order to select the individual cost functions (i.e., shadow details, highlight details, and color saturation) to be considered during the optimization process; (ii) select the BPC algorithm to be used depending on the selected individual cost functions from procedure (i); (iii) derive a model that captures the relationship between the inputs of the BPC algorithm and the selected individual cost functions; (iv) optimize all the BPC parameters to maximize the individual cost functions; and (v) provide either a set of prints or soft-proof images with different BPC parameters when customers request to optionally do so (i.e., customers can optionally request the algorithm to provide different solutions out of the optimization process).

The present disclosure includes features like BPC optimization during image ripping time, use of a BPC algorithm with three parameters, and adapting the individual cost functions (shadows, highlight, and color attributes) based on image content. By optimizing the BPC parameters during ripping time, attributes of an original image are preserved independent of the color printer where the image is printed. Therefore, if the same image is printed using different color devices at the same time, the optimization is carried out in real time in each printer to seek to maximize the individual cost functions automatically selected. If the input image contained no, or few, saturated colors, then errors in saturated color rendering are included in the optimization. The parameter set with the minimum perceptual impact may be chosen. This calculation is done during Raster Image Processing (RIP). The optimization may be tuned by the customer to emphasize shadow, highlight or saturated color fidelity.

Figure 1A:
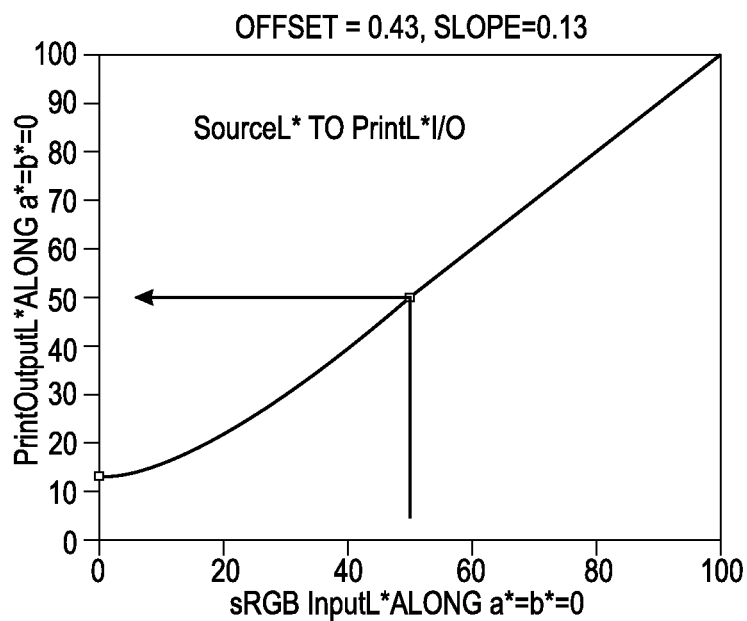
FIGS. 1A-1D show relationships between $L^*_i$ and $L^*_0$ for different slope and offset parameter values.
Figure 1B:
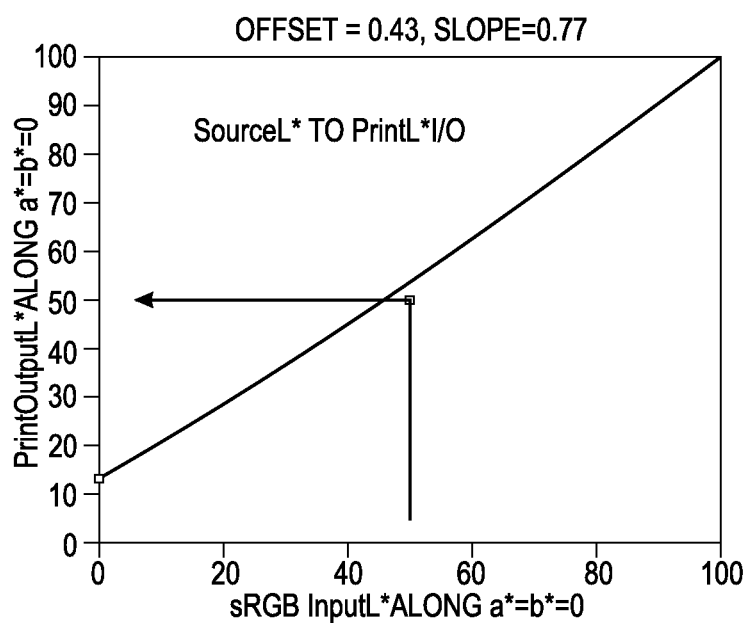
Figure 1C:
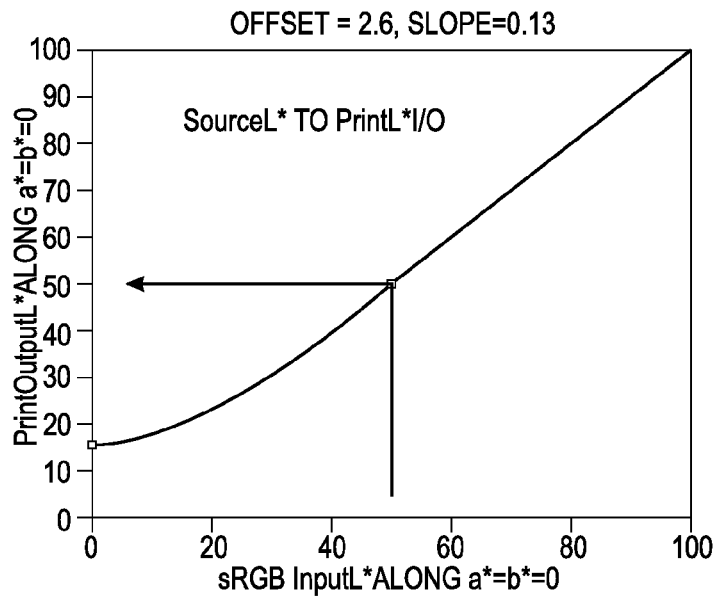
Figure 1D:
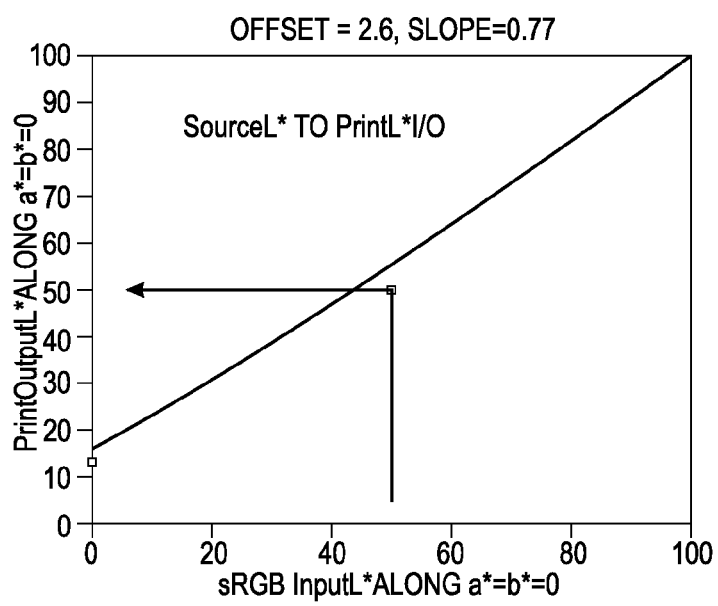
Figure 2:
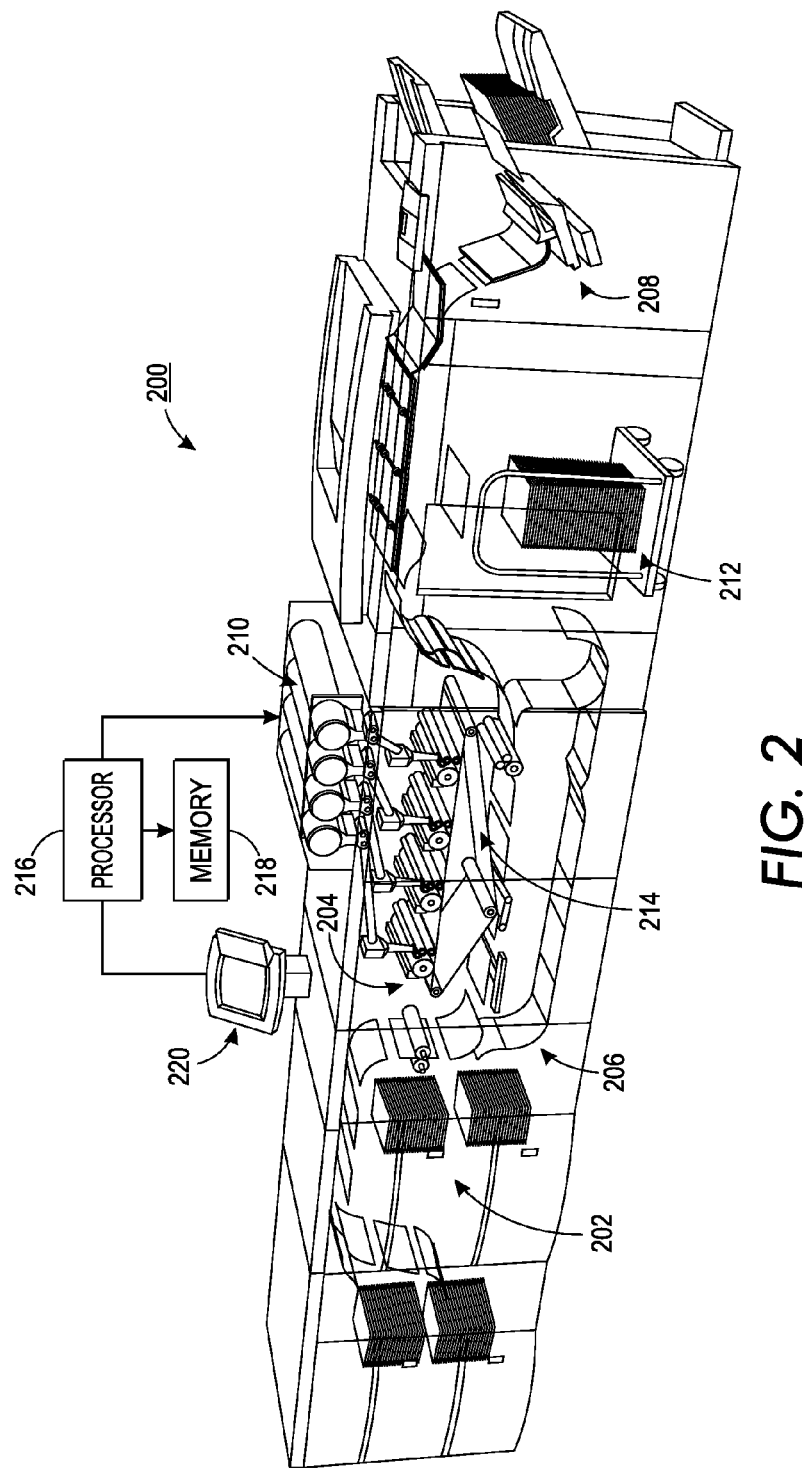
FIG. 2 shows an image printing system in accordance with an embodiment of the present disclosure.

FIG. 2 shows a schematic illustration of an image printing system 200, in accordance with an embodiment of the present disclosure. The system 200 is configured to optimize the BPC parameters in accordance with an embodiment of the present disclosure. The image printing system 200 generally includes one or more sources 202 of printable substrate media that are operatively connected to a print engine 204, an output path 206 and a finishing system 208. As illustrated, the print engine 204 may be a multi-color engine having a plurality of imaging/development subsystems 210 that are suitable for producing individual color images. A stacker device 212 may also be provided as known in the art.

The print engine 204 may mark xerographically; however, it will be appreciated that other marking technologies may be used, for example by ink jet marking, ionographically marking or the like.

In one implementation, the image printing system 200 may be a Digital Press. For example, the print engine 204 may render toner images of input image data on a photoreceptor belt (or drum) 214, where the belt 214 then transfers the images to the substrate.

A display device 220 may be provided to enable the user to control various aspects of the image printing system 200, in accordance with the embodiments disclosed therein. The system 200 includes a processor 216 that executes, and a memory 218 that stores, computer-executable instructions for carrying out the various procedures and performing the various functions described herein.

Figure 3:
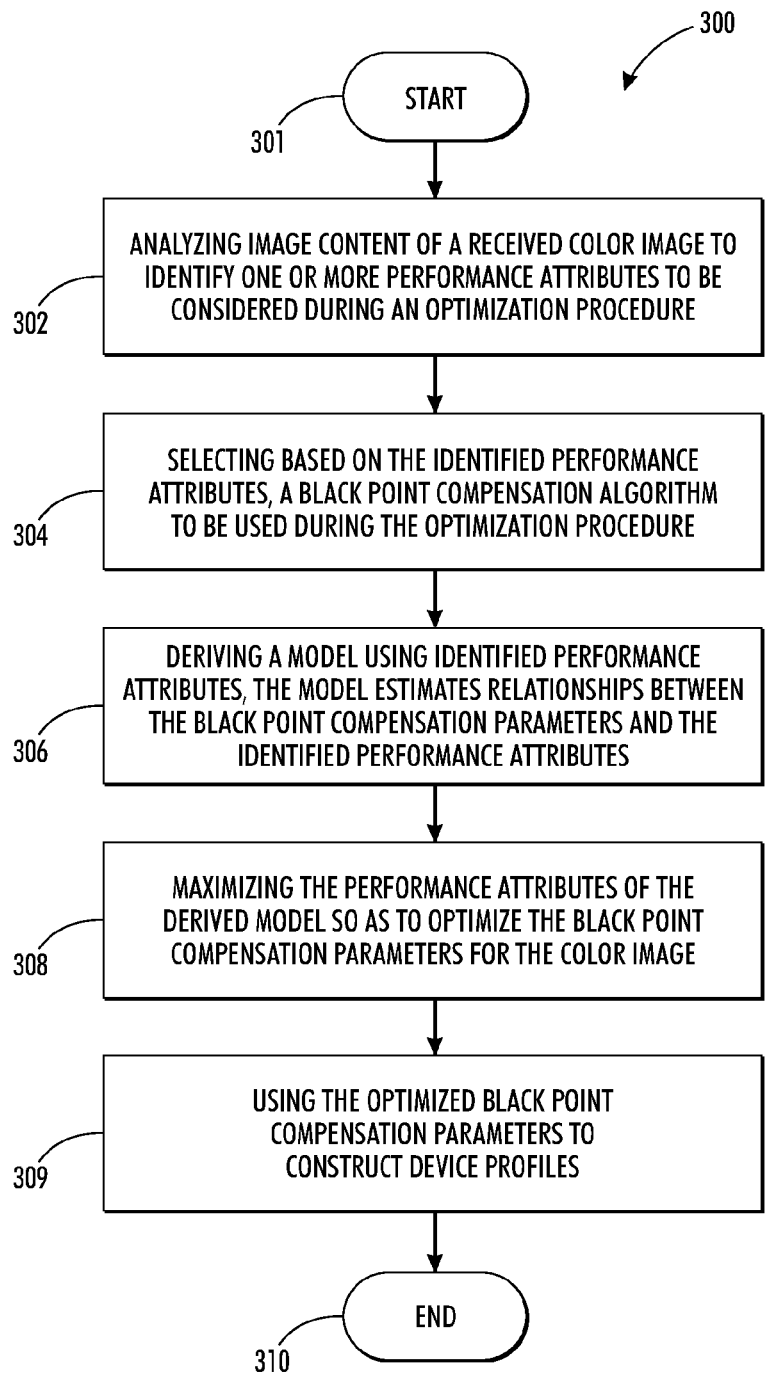
FIG. 3 shows a method for optimizing the BPC parameters of a color image in accordance with an embodiment of the present disclosure.
Figure 6:
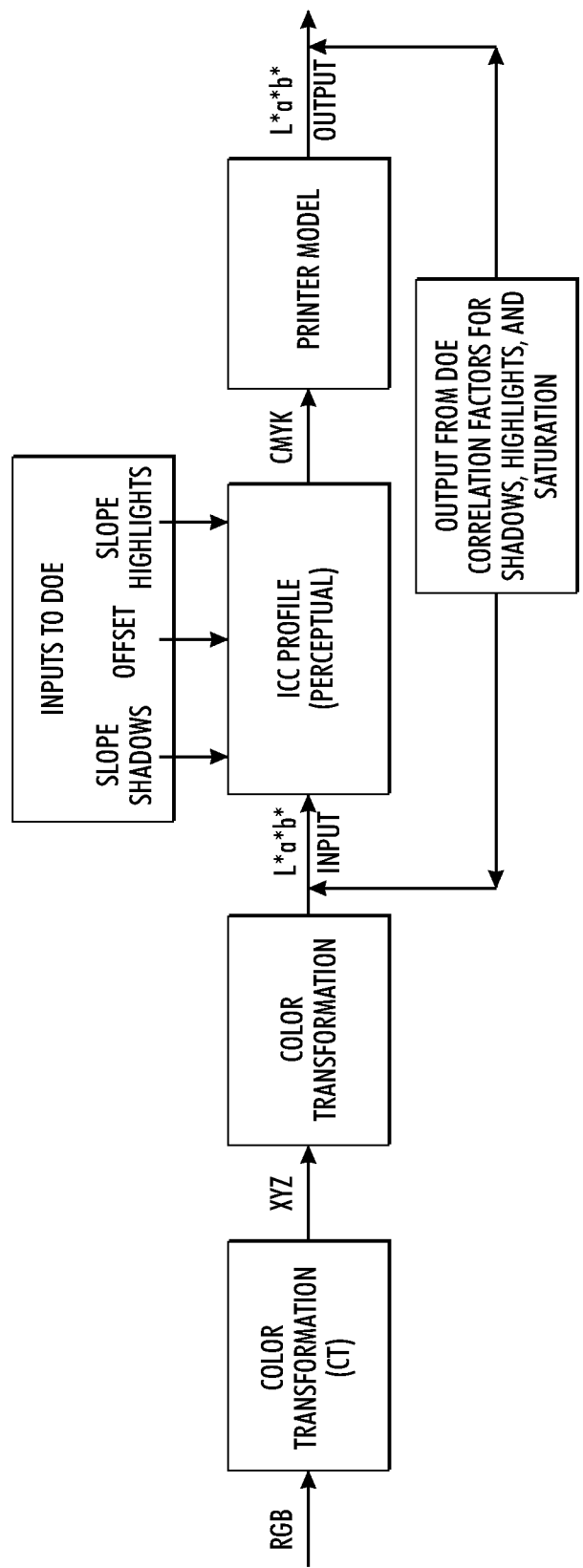
FIG. 6 shows a block diagram that describes inputs and outputs of the model in accordance with an embodiment of the present disclosure.

FIG. 3 shows a flowchart summarizing a method 300 for optimizing the BPC parameters in a color image. The method 300 is implemented in a computer system comprising one or more processors 216 configured to execute one or more computer program modules. The method 300 begins at procedure 301. FIG. 6 shows a block diagram that describes inputs and outputs of the model in accordance with an embodiment of the present disclosure.

Referring to FIGS. 2, 3 and 6, at procedure 302, a color image is received by the display device 220 or a Digital Front End (DFE) and is sent to the processor 216 for further processing.

In one embodiment, referring to FIG. 6, an RGB image is received as the input. This input image, in a device dependent RGB color space, is first transformed into a device-independent XYZ color space, and the input image data in the XYZ color space is then transformed into a device-independent L*a*b* color space. The input image in the device-independent L*a*b* color space is sent to the processor 216 for further processing.

Also, at procedure 302, image content of the received color image is analyzed to identify one or more performance attributes to be considered during an optimization procedure. The performance attributes estimate an effect of the black point compensation parameters on the image quality of the received color image. The image quality of the received color image comprehends at least shadow details, highlight details and color attributes of the received color image.

Shadows details, highlight details, and color attributes are among the variables that are important to preserve when printing images (i.e., reproducing original images in color printers). Without loss of generality, the method of the present disclosure focuses on saturation of colors as the color attribute, but other color attributes may be included during the image analysis. It is also assumed that a current printer model and a printer gamut are available that characterize the printer where the images are to be reproduced.

One or more performance attributes include correlation factors for the shadow details, highlight details and color attributes of the received color image. The correlation factors are configured to estimate the effect of the black point compensation parameters on the shadow details, highlight details and color attributes of the received color image, respectively.

That is, there is a need to quantify how the BPC parameters affect shadow details, highlight details, and color attributes of the received color images. A value of the correlation factor is used for this purpose. The correlation factors provide correlation between the original values contained in a color image or a group of color images and the modified values when the original values are passed through an ICC profile or output device profile. The values of the correlation factors are numbers equal or greater than −1 and equal or less than 1. The more positive the correlation factor, the stronger the correlation between the input and output.

Shadow details of the color image may be quantified by absolute values of $\rho_{sh}$ as shown in Equation (2).

$$\rho_{sh} = \frac{E[(H_o - \overline{H_o})(H_m - \overline{H_m})]}{(\text{std}(H_o) * \text{std}(H_m))} \quad (2)$$

where $\rho_{sh}$ is the shadow detail virtual sensor or shadow detail correlation factor;

E is the expected value;

$H_o$ are the original L* values in a color image or a group of color images;

$\overline{H_o}$ is the average of the original L* values in a color image or a group of color images;

$H_m$ are the modified L* values in a color image or a group of color images after passing them through an ICC profile;

$\overline{H_m}$ is the average of the modified L* values after passing them through an ICC profile; and std is the standard deviation.

Highlight details of the color image may be quantified by absolute values of $\rho_g$ as shown in Equation (3).

$$\rho_g = \frac{\text{std}(L^*_{ICC})}{\text{std}(L^*_{org})} \quad (3)$$

where $\rho_g$ is the highlight detail virtual sensor or highlight detail correlation factor;

$L^*_{icc}$ are the L* values obtained from an ICC profile;

$L^*_{org}$ are the L* values of the original image; and std is the standard deviation.

Saturation of color may be quantified by the absolute values of $\rho_s$ as shown in Equation (4).

$$\rho_s = \frac{E[(S_o - \overline{S_o})(S_m - \overline{S_m})]}{(std(S_o) * std(S_m))} \quad (4)$$

where $\rho_s$ is the saturation of color virtual sensor or saturation of color correlation factor;

E is the expected value;

$S_o$ are the original saturation (chroma divided by lightness) values in a color image or a group of color images;

$\overline{S_o}$ is the average of the original saturation values in a color image or a group of color images;

$S_m$ are the modified saturation values in a color image or a group of color images after passing them through an ICC profile;

$\overline{S_m}$ is the average of the modified saturation values after passing them through an ICC profile; and std is the standard deviation.

In one embodiment, the color attribute may include saturation of colors. However, it is contemplated that the color attribute may include any other color attribute of the color image that is different from the saturation of colors. In another embodiment, the method and the system may include more than one color attribute. In one embodiment, S may also be defined as the chroma of pixels contained in an image or any other variable of interest.

For example, at procedure 302, the method is configured to search for dark neutral colors contained in the received image that are outside the printer gamut. If dark neutral colors outside the printer gamut are contained in the received image, individual performance attribute for shadow details is included during the optimization procedure.

At procedure 302, the method is also configured to search for light neutral colors contained in the received image. If the image to be printed contains light neutral colors, then an individual performance attribute for highlight details is included in the optimization procedure.

At procedure 302, the method is also configured to search for chromatic colors contained in the received image. If the image to be processed contains chromatic colors, then an individual performance attribute for color saturation is included in the optimization procedure. Chromatic colors in images may be detected by determining if those colors are outside of a pre-defined circle in the Chroma plane. Another criterion that may be used is by determining if there are chromatic colors that are outside of the printer gamut.

Referring to FIG. 3, at procedure 304 of the method 300, the processor 216 is configured to select, based on the identified performance attributes, a black point compensation (BPC) algorithm to be used during the optimization procedure.

Figure 5:
FIG. 5 shows images containing highlight details, color attributes (color saturation), and shadow details information.

When the image shown in FIG. 5 is received by the DFE, the method analyzes this image and determines that this image contains shadow details, highlight details, and saturated colors. Therefore, the method then selects a three parameter black point compensation algorithm to be used during the optimization procedure. That is, this three parameter black point compensation algorithm comprehends all three individual performance attributes. The correlation factors, discussed above, are used as individual performance attributes.

The present disclosure implements a switching mechanism that establishes the type of BPC algorithm that is used during the optimization procedure. For example, if individual performance attributes for (a) shadow details or (b) shadow details and color saturation is selected at procedure 302, then a BPC algorithm with two BPC parameters is used during the optimization procedure. On the other hand, if individual performance attributes for highlight details, shadow details, and saturation are selected in at procedure 302, then a BPC algorithm with three BPC parameters is used during the optimization procedure.

For the case where shadow details are not contained in the received image, there is no a reason to apply a BPC algorithm to the image. However, there is evidence that highlights and color saturation in images can be optimized by manipulating the BPC parameters. Therefore, although this is not required, this possibility is not excluded.

The parabolic part of the two-parameter BPC algorithm is described by the Equation (5).

$$L^*_o = L^*_p + \text{offset} + m * L^*_i + n * L^{*2}_i \quad (5)$$

where $L^*_o$ is the L* output by the BPC algorithm (i.e., image data to be rendered by the printer);

$L^*_p$ is the minimum L* value that the printer can produce;

$L^*_i$ are the L* values obtained from an image or a group of images to be rendered;

$L^*_{min}$ is the minimum L* value that can be achieved in the printer;

Offset is the first tunable parameter of the BPC algorithm and can be used to adjust for the known statistics of the input image (for example, if $L^*_i$ never goes to zero, it would waste dynamic range to map $L^*_i=0$ to $L^*_p$);

m is the second tunable BPC parameter of the BPC algorithm or slope; and n is equal to the expression $$\frac{(1-m)^2}{4 * L^*_i}$$

which makes the $L^*_o$ curve become tangent to the identity curve ($L^*_o=L^*_i$) at the critical value $L^*_c=(1-m)/(2*n)$.

For the light region ($L^*_i$ greater than $L^*_c$), the identity curve is used. The second tunable parameter of the BPC algorithm, m, is the slope of the BPC parabolic function. This parameter controls the shape of the parabola joining the identity part of the BPC curve (i.e., when $L^*_i=L^*_o$). The parabolic part joins the identity part of the BPC curve ($L^*_o=L^*_i$) at $L^*_{crit}$ which is equal to the expression $2*(L^*_{min}+\text{offset})/(1-m)$. Note that to simplify the math, in these equations $L^*=1$ is white. FIGS. 1A-1D show the effect of offset and m on $L^*_o$. In these figures, the usual 0-100 encoding is used.

The three-parameter BPC algorithm is used when $L^*_{crit}$ is greater than 1, since in that case only the parabolic equation is used, and $L^*_o$ is greater than 1 for $L^*_i=1$. This would produce highlight clipping. Therefore, a second parabolic region is joined to the first to produce a controlled roll off in the highlight region to preserve highlight detail. The second parabolic region is described by Equation (6).

$$L^*_o = 1 + m_h * (L^*_i - 1) - n_h * (L^*_i - 1)^2 \quad (6)$$

Where $m_h$ is the third tunable BPC parameter called the highlight slope;

$n_h$ is equal to 0.25*

$$0.25 * \frac{(D_m^2 - 4*n*D_h)}{(n+D_S)};$$

$D_m$ is equal to $m_h$−m, $D_h$ is equal to $L^*_{min}$+offset−1+$m_h$, and $D_s$=$L^*_{min}$+offset−1+m.

The two parabolic forms join where $L^*_i$ is equal to 0.5* $(D_m+2* n_h)/(n+n_h)$.

Figure 4:
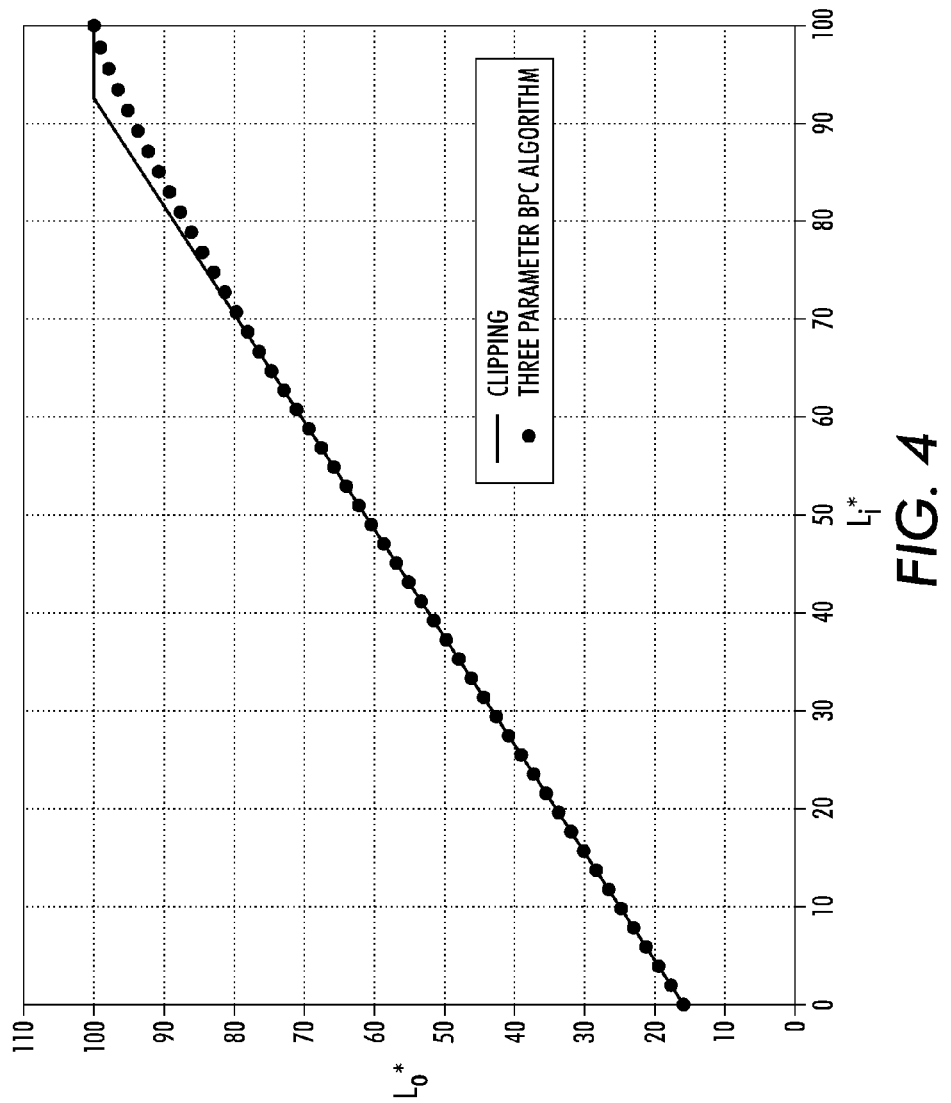
FIG. 4 shows an effect of three BPC parameters on the output $L^*_0$.

FIG. 4 shows the effect of the three BPC parameters (i.e., offset, slope and highlight slope) on the output $L^*_o$. FIG. 4 shows relationship between $L^*_i$ and $L^*_o$ for clipped $L^*_o$ values (continuous line) and the three-parameter BPC algorithm (dotted line). $L^*_i$ and $L^*_o$ are shown on the Y-axis and X-axis, respectively, of the graph shown in FIG. 4. As can be seen, adding a parabolic highlight region eliminates the clipping. The $m_h$ parameter is the slope of the BPC curve at $L^*_i$=1.

Referring to FIG. 3, at procedure 306 of the method 300, the processor 216 is configured to derive a model using the identified performance attributes. The model is configured to estimate relationships between the black point compensation parameters and the identified performance attributes. That is, the black point compensation parameters are the inputs and the identified performance attributes of interest are the outputs of this model. As noted above, the performance attributes may include shadow details performance attribute, highlight details performance attribute and color attributes performance attribute.

The derivation of this model is useful for performing the optimization of the BPC parameters. For example, if the outputs (i.e., the performance attributes) are obtained for a few different input values (i.e., the offset parameter value and the slope parameter value) and no output information at other input values is known, then a model is first constructed using the obtained outputs and their corresponding inputs. The output information at any other desired input values can thus be obtained from this constructed model.

The model can be derived depending upon the type of optimization problem for which a solution is desired. For example, if it is desired to optimize the BPC parameters for a set of media, then the models for $\rho_{sh}$ $$\frac{1}{\rho_g},$$

and $\rho_s$ may be derived using a Design of Experiments (DOE) with an outer-array method. The DOE with the outer-array method is described in detail in "Design for Six Sigma: The tool guide for practitioners," by Lisa A. Reagan and Mark J. Kiemele, published by CTQ Media, Bainbridge Island, Wash., which herein is incorporated by reference in its entirety. The model derived using DOE provides robustness for a set of media of interest.

In one embodiment, the models for $\rho_{sh}$, $$\frac{1}{\rho_g},$$

and $\rho_s$ may be derived using a Design of Experiments (DOE) using a Multivariate Adaptive Regression Splines (MARS). The DOE using the Multivariate Adaptive Regression Splines (MARS) is described in detail in "Multivariate Adaptive Regression Splines" by Friedman, J. H. published in 1991 in Annals of Statistics 19 (1), pages 1-78, which is provided in the Appendix A filed along with this application herein is incorporated by reference in its entirety. It is contemplated, however, that other approaches may also be applied here. In one embodiment, the points used for deriving the MARS model were obtained using a descriptive sampling. For example, descriptive sampling is explained in detail in "Descriptive Sampling: An Improvement Over Latin Hypercube Sampling," by Eduardo Saliby published in Proceedings of the 29th Conference on Winter Simulation, pages 230-233, IEEE Computer Society Washington, D.C., 1997, which is provided in the Appendix B filed along with this application and herein is incorporated by reference in its entirety.

Referring to FIG. 3, at procedure 308 of the method 300, the processor 216 is configured to maximize the performance attributes of the derived model so as to optimize the black point compensation parameters for the color image. At procedure 308, the BPC parameters are manipulated in such a way that the individual performance attributes selected or identified at procedure 302 are maximized.

If there is only a single performance attribute to be maximized, then any optimization method that deals with a single performance attribute may be used. If there are two or more performance attributes, then multi-objective optimization approach may be used.

Mathematically, this can be formulated as: finding the value of x* that maximizes the function J(x). The function J(x) is defined by the Equation (7) below and x* is defined by Equations (8) and (8a) below, when two performance attributes are considered and all three performance attributes are considered, respectively.

$$J(x)=[\rho_{sh}(\text{offset}^*,m^*),\rho_g^{-1}(\text{offset}^*,m^*),\ldots,\rho_s(\text{offset}^*,m^*)] \quad (7)$$

where J(x) is a function that is to be maximized;

$\rho_{sh}$ (offset*, m*) is the shadow correlation factor or the shadow virtual sensor, the shadow correlation factor being a function of the parameters of the BPC algorithm selected in the procedure 304;

$\rho_g^{-1}$ (offset*, m*) is the highlights correlation factor or the highlights virtual sensor, the highlights correlation factor being a function of the parameters of the BPC algorithm selected in the procedure 304;

$\rho_s$(offset*, m*) is the saturation correlation factor or the saturation virtual sensor, the saturation correlation factor being a function of the parameters of the BPC algorithm selected in the procedure 304.

$$x^*=(\text{offset}^*,m^*) \text{ if the 2-parameter BPC is chosen} \quad (8)$$

where x*=the value that maximizes the function J(x);

offset*=the BPC parameter or the offset parameter value(s) that maximizes the outputs (correlation factors) of the derived model; and m*=the BPC parameter or the slope parameter value(s) that maximizes the outputs (correlation factors) of the derived model.

$$x^* = (\text{offset}^*, m^*, m^*_h) \text{ if the 3-parameter BPC is chosen} \quad (8a)$$

where x*=the value that maximizes the function J(x);

offset*=the BPC parameter or the offset parameter value(s) that maximizes the outputs (correlation factors) of the derived model;

m*=the BPC parameter or the slope parameter value(s) that maximizes the outputs (correlation factors) of the derived model; and m*$_h$=the BPC parameter or the highlight slope parameter value(s) that maximizes the outputs (correlation factors) of the derived model.

In one embodiment, Multi-Objective Pareto Optimization technique is used to optimize the BPC parameters (i.e., the offset parameter and the slope parameter or the offset parameter, the slope parameter, and the highlight slope parameter) such that the correlation coefficients (i.e., $\rho_{sh}$, $\rho_g^{-1}$, and $\rho_s$) are maximized. For example, Multi-Objective Pareto Optimization is described in detail in "Survey of Multi-Objective Optimization Methods For Engineering," by R. T. Marler and J. S. Arora published in 2004 in Structural and Multidisc Optimization 36, pages 369-395, which is provided in the Appendix C filed along with this application herein is incorporated by reference in its entirety.

As shown in FIG. 6, the inputs of this model include shadow slope, offset, and highlights slope. The outputs of this model include correlation factors for shadow, highlights, and saturation. As shown in FIG. 6, the method and the system of the present disclosure includes an output feedback loop/control. The inputs (BPC parameters) are manipulated in such a way that the outputs (correlation factors) of the derived model are maximized.

Figure 7:
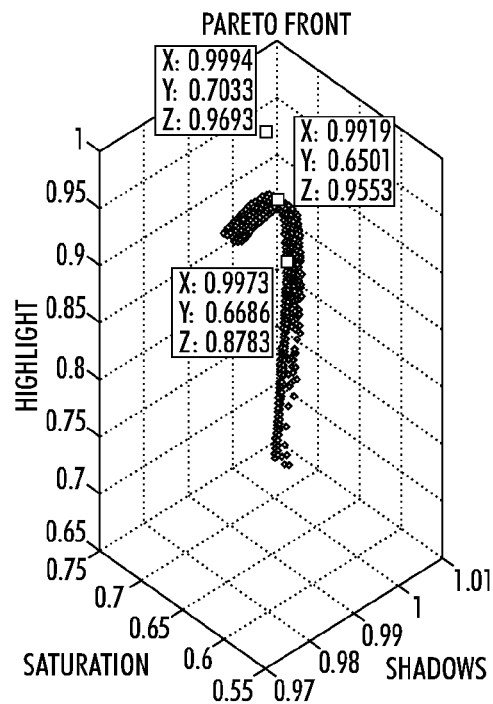
FIGS. 7 and 8 show Multiple-Point Pareto Front Optimizations that are used to optimize the BPC parameters in accordance with an embodiment of the present disclosure.
Figure 8:
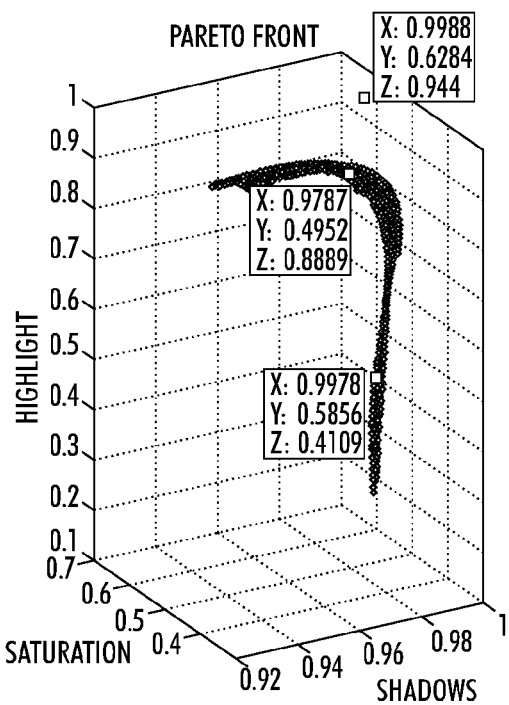
Figure 9A:
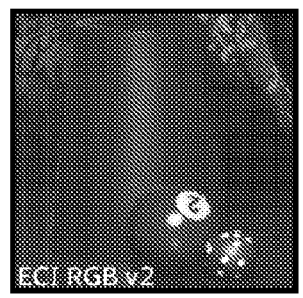
FIGS. 9(a)-9(f) show a soft-proof of some of the images shown in FIG. 5 using a regular toner.
Figure 9B:
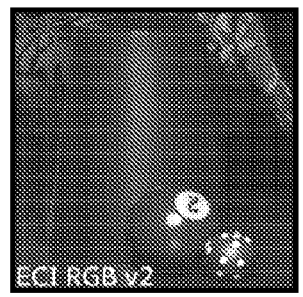
Figure 9C:
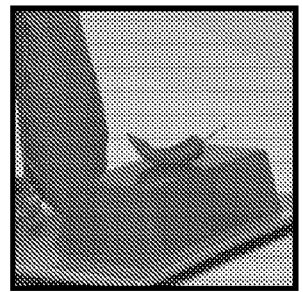
Figure 9D:
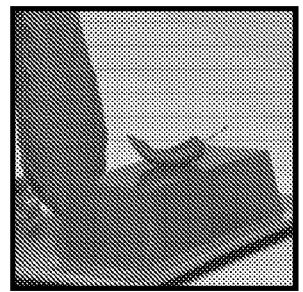
Figure 9E:
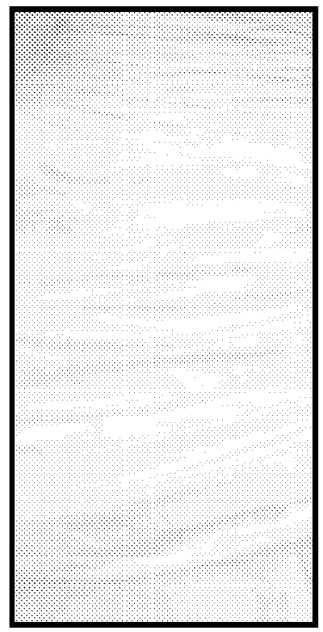
Figure 9F:
Figure 10A:
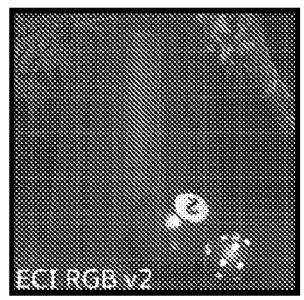
FIGS. 10(a)-10(f) show a soft-proof of some of the images shown in FIG. 5 using a Matte Dry Ink (MDI) toner.
Figure 10B:
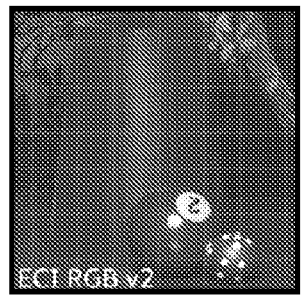
Figure 10C:
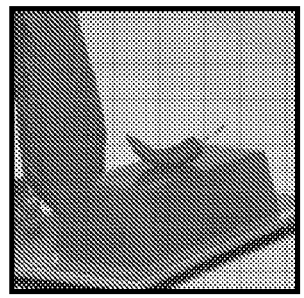
Figure 10D:
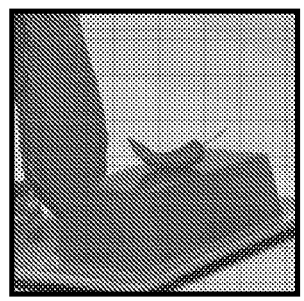
Figure 10E:
Figure 10F:

FIGS. 7 and 8 provide Multiple-point Pareto Front. The graphs shown in FIGS. 7 and 8 illustrate shadow correlation factor on an x-axis. On a y-axis, the graphs of FIGS. 7 and 8 illustrate saturation correction factor and on a z-axis, the graphs of FIGS. 7 and 8 illustrate highlights correlation factor. The optimization of the BPC parameters is based on possible conflicting objectives using the Multi-objective Pareto Optimization.

Referring to FIGS. 7 and 8, the Pareto Front obtained is a multiple point front where the three conditions ($\rho_{sh}$, $\rho_g^{-1}$, and $\rho_s$) are selected to satisfy certain preferences. A point is selected where all the conditions are satisfied by finding the minimum distance between a point that contains the maximum possible performance attributes and a point on the Pareto Front. In one embodiment, as shown in FIG. 7, the optimized parameters output by this Multiple-point Pareto Front algorithm were at offset parameter value=1, shadow slope value=0.6565, and highlight slope value=0.9, when regular tone was used. As shown in FIG. 8, the optimized parameters output by this Multiple-point Pareto Front algorithm were at offset parameter value=0.9797, shadow slope value=0.5156, and highlight slope value=0.3489, when Matte Dry Ink (MDI) tone was used. Matte Dry Ink is a formulation of all four Cyan, Magenta, Yellow and Black (CMYK) toners which gives a matte appearance to print jobs.

Different points on the Pareto Front may similarly be obtained by assigning weights on the objectives of more interest. One example is the weighted Euclidean distance, $$d = \sum_{i=1}^{n} w_i \left( \frac{J_i(x) - J_{user}(x)}{\overline{J}_i - \underline{J}_i} \right),$$

$w_i \in (0,1)$, $\Sigma w_i = 1$, where x contains the BPC parameter values associated to a point on the Pareto Front, $J_{user}(x)$ is the point specified by the user, $\overline{J}_i$ is the maximum value of the $i^{th}$ performance attribute, $\underline{J}_i$ is the minimum value of the $i^{th}$ performance attribute, and $w_i$ is the weight for each $J_i$. A solution x* is chosen by the value that minimizes the Euclidean distance d.

Referring back to FIGS. 2 and 3, the method, at procedure 309, includes a procedure in which the processor 216 is configured to construct output device profiles using the optimized black point compensation parameters. The output device profiles are ICC profiles. The optimized black point compensation parameters are used to maximize the shadow details, highlight details and color attribute of the received image, when the received image is printed by an output device. The output device is an image printing system.

The method optionally includes providing either a set of prints or soft-proof images with different BPC parameters when the customers request to do so. That is, the customers can optionally request the algorithm to provide different solutions out of the optimization process.

Specifically, when the customers submit the image to the DFE, the customer can indicate in the queue whether the customer likes to be offered with multiple potential solutions (i.e., a set of different BPC parameters' combinations that may be used when there are conflicting performance attributes). If customer indicates that the customer likes to evaluate different options, then weights may be used to obtain different points on the Pareto front. For instance, one option for returning a set of solutions is shown in Equation (9).

$$\min \sqrt{\sum_{i=1}^{3} \left( \frac{w_i(\rho_i(f) - y)}{\rho_{i,\max} - \rho_{i,\min}} \right)^2} \quad (9)$$

where $w_i$ are the weights that the customers can enter manually or via slide bars;

$\rho_i$ (f) is any point in the Pareto front;

y is a vector that contains the maximum values of the performance attributes (i.e., shadow details, highlight details, and saturation of colors)

$\rho_{i,max}$ is the maximum value of each performance attribute; and $\rho_{i,min}$ is the minimum value of each performance attribute.

The sum of the weights $w_i$ has to satisfy $\Sigma w_i = 1$. FIGS. 7 and 8 show different points selected on the Pareto front when different set of weights are used in Equation (9).

Finally, FIGS. 9(a)-9(f) and 10(a)-10(f) show soft-proofs of some of the images contain in FIG. 4 for the printer with regular and MDI toner, respectively.

If there is a single performance attribute to optimize, the algorithm returns a single point with a message that indicates that there are no multiple solutions. If there are more than two performance attributes, then different options are provided to the customer. Each option may emphasize one or more performance attributes over the rest (e.g., a set of BPC parameters that offer more shadow details and less saturation and highlight details). One option may be to maximize all performance attributes. The outcome of these options may be shown via soft-proof or via printed images. The customer can then select the preferred option. The method ends at procedure 310.

Thus, the method of present disclosure proposes to (i) analyze the content of images during image ripping time in color printers, (ii) decide proper BPC algorithm that should be used, (iii) decide on the individual performance attributes to be considered during the optimization process, and (iv) provide either a set of prints or soft-proof images with different BPC parameters when customers request to optionally do so.

The method provides a BPC algorithm with an additional input that minimizes highlight clipping. The present disclosure also contains a variation on existing black point compensation equations, including a rollover term to minimize loss of highlight detail. The method proposes optimizing BPC parameters executed while the image is ripped, selecting performance attributes to be optimized based on the content of image features of interest (highlights, shadows, and saturation), and deciding, using a switching mechanism, which BPC algorithm to use during the optimization procedure. Other benefits of the present disclosure may include improved color fidelity of printed images. The method proposes optimizing black point compensation on an image-by-image basis. Multiple sets of black point compensation parameters may be tried. The error in color rendering for each of the parameter sets is measured for only those colors in the target image.

Wherever used herein, terms "optimizing" or "maximizing" shall be construed broadly, such as to show an improvement of performance among a given set of measurements or values in a given practical situation, and not necessarily to show a provable mathematical optimum or maximum.

Shadows are the dark colors contained in an image whereas highlights are the light bright colors in an image. Shadows/highlights details refer to the content of a set of dark/light colors present in an image. The loss of shadows/highlight in a printed image is the hidden details of the dark/light colors present in an original image. Color attributes can be represented by chroma, saturation, and any other terminology described in color theory. Chroma is the attribute of color used to indicate the degree of departure of the color from a gray of the same lightness. Saturation can be defined as chroma divided by lightness.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for processing black point compensation (BPC) parameters for a color image to be printed so as to enhance image quality of the color image, the method being implemented in a computer system comprising one or more processors configured to execute one or more computer program modules, the method comprising:

analyzing image content of a received color image to identify one or more performance attributes to be considered during a black point compensation parameters processing procedure, wherein the performance attributes estimate an effect of the black point compensation parameters on the image quality of the received color image;

selecting, based on the identified performance attributes, a black point compensation (BPC) algorithm to be used during the processing procedure;

deriving a model using the identified performance attributes, the model being configured to estimate relationships between the black point compensation parameters of the selected black point compensation (BPC) algorithm and the identified performance attributes;

maximizing the performance attributes of the derived model so as to process the black point compensation parameters for the color image; and using the processed black point compensation parameters to construct output device profiles.

2. A method of claim 1, wherein the image quality of the received color image comprehends at least shadow details, highlight details and color attributes of the received color image.

3. A method of claim 2, wherein the one or more performance attributes include correlation factors for the shadow details, highlight details and color attributes of the received color image, wherein the correlation factors are configured to estimate the effect of the black point compensation parameters on the shadow details, highlight details and color attributes of the received color image, respectively.

4. A method of claim 2, wherein the processed black point compensation parameters are used to maximize the shadow details, highlight details and/or color attribute of the received color image, when the received color image is printed by an output device.

5. A method of claim 2, wherein the color attributes of the color image include color saturation and chroma.

6. A method of claim 1, wherein the BPC algorithm is a two parameter BPC algorithm having a first tunable parameter and a second tunable parameter.

7. A method of claim 6, wherein the first tunable parameter is an offset value and the second tunable parameter is a slope of a black point compensation function.

8. A method of claim 1, wherein the BPC algorithm is a three parameter BPC algorithm having a first tunable parameter, a second tunable parameter and a third tunable parameter.

9. A method of claim 8, wherein the first tunable parameter is an offset value, the second tunable parameter is a slope of a black point compensation function and the third tunable parameter is a highlight slope of a black point compensation function.

10. A method of claim 1, wherein the performance attributes are maximized using a Multi-Objective Pareto Optimization procedure.

11. A system for processing black point compensation parameters for a color image to be printed by an image printing system so as to enhance image quality of the color image, the system comprising:

a processor configured to:

analyze image content of a received color image to identify one or more performance attributes to be considered during a black point compensation parameters processing procedure, wherein the performance attributes estimate an effect of the black point compensation parameters on the image quality of the received color image;

select, based on the identified performance attributes, a black point compensation (BPC) algorithm to be used during the processing procedure;

derive a model using the identified performance attributes, the model being configured to estimate relationships between the black point compensation parameters of the selected black point compensation (BPC) algorithm and the identified performance attributes;

maximize the performance attributes of the derived model so as to process the black point compensation parameters for the color image; and use the processed black point compensation parameters to construct output device profiles.

12. A system of claim 11, wherein the image quality of the received color image comprehends at least shadow details, highlight details and color attributes of the received color image.

13. A system of claim 12, wherein the one or more performance attributes include correlation factors for the shadow details, highlight details and color attributes of the received color image, wherein the correlation factors are configured to estimate the effect of the black point compensation parameters on the shadow details, highlight details and color attributes of the received color image, respectively.

14. A system of claim 12, wherein the processed black point compensation parameters are used to maximize the shadow details, highlight details and/or color attribute of the received color image, when the received color image is printed by an output device.

15. A system of claim 12, wherein the color attributes of the color image include color saturation and chroma.

16. A system of claim 11, wherein the BPC algorithm is a two parameter BPC algorithm having a first tunable parameter and a second tunable parameter.

17. A system of claim 16, wherein the first tunable parameter is an offset value and the second tunable parameter is a slope of a black point compensation function.

18. A system of claim 11, wherein the BPC algorithm is a three parameter BPC algorithm having a first tunable parameter, a second tunable parameter and a third tunable parameter.

19. A system of claim 18, wherein the first tunable parameter is an offset value, the second tunable parameter is a slope of a black point compensation function and the third tunable parameter is a highlight slope of a black point compensation function.

20. A system of claim 11, wherein the performance attributes are maximized using a Multi-Objective Pareto Optimization procedure.

* * * * *